United States Patent [19]
Berry et al.

[11] Patent Number: 5,923,324
[45] Date of Patent: Jul. 13, 1999

[54] VIEWER INTERACTIVE THREE-DIMENSIONAL WORKSPACE WITH INTERACTIVE THREE-DIMENSIONAL OBJECTS AND CORRESPONDING TWO-DIMENSIONAL IMAGES OF OBJECTS IN AN INTERACTIVE TWO-DIMENSIONAL WORKPLANE

[75] Inventors: Richard Edmond Berry; Scott Harlan Isensee, both of Georgetown, Tex.

[73] Assignee: International Business Machines Corporation, Armonk, N.Y.

[21] Appl. No.: 08/826,617

[22] Filed: Apr. 4, 1997

[51] Int. Cl.[6] ................................................ G06F 15/00
[52] U.S. Cl. ............................................................ 345/334
[58] Field of Search ................................... 345/419, 470, 345/116, 117, 333, 334, 335

[56] References Cited

U.S. PATENT DOCUMENTS

| | | |
|---|---|---|
| 4,899,136 | 2/1990 | Beard et al. .............................. 340/706 |
| 5,227,985 | 7/1993 | DeMenthon ............................. 364/559 |
| 5,270,694 | 12/1993 | Naimark et al. ......................... 345/123 |
| 5,432,895 | 7/1995 | Myers ...................................... 395/119 |
| 5,490,239 | 2/1996 | Myers ...................................... 395/129 |
| 5,579,455 | 11/1996 | Berry et al. .............................. 395/122 |

*Primary Examiner*—Phu K. Nguyen
*Attorney, Agent, or Firm*—J.B. Kraft

[57] ABSTRACT

A system, method and computer program are provided for a virtual three-dimensional workspace containing a plurality of three-dimensional objects which may be interactively addressed or accessed by the viewer or user to perform a variety of interactive functions. In addition to these objects, the present invention provides a two-dimensional workplane setup at the front of the three-dimensional workspace which the viewer selectively contains two-dimensional images corresponding to and resembling selected three-dimensional whereby the user may select either the three-dimensional object or its two-dimensional image to perform particular interactive functions.

12 Claims, 8 Drawing Sheets

VIEWER INTERACTIVE THREE-DIMENSIONAL WORKSPACE WITH INTERACTIVE THREE-DIMENSIONAL OBJECTS AND CORRESPONDING TWO-DIMENSIONAL IMAGES OF OBJECTS IN AN INTERACTIVE TWO-DIMENSIONAL WORKPLANE

CROSS-REFERENCE TO RELATED PATENT APPLICATIONS

The following three copending applications are related: the present application covering a three-dimensional workspace containing user interactive three-dimensional objects and two-dimensional images of such objects which are also user interactive so that the interactive user may choose to functionally access either three-dimensional objects or their simultaneously visible two-dimensional images; a copending application entitled "VIEWER INTERACTIVE THREE-DIMENSIONAL OBJECTS AND TWO-DIMENSIONAL IMAGES IN VIRTUAL THREE-DIMENSIONAL WORKSPACE", Richard E. Berry et al.; and a copending application entitled "VIEWER INTERACTIVE THREE-DIMENSIONAL WORKSPACE WITH A TWO-DIMENSIONAL WORKPLANE CONTAINING INTERACTIVE TWO-DIMENSIONAL IMAGES", R. E. Berry.

TECHNICAL FIELD

The present invention relates to user interactive computer supported display technology and particularly to such user interactive systems and methods which are user friendly, i.e. provide even noncomputer literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

Industry has been working towards this challenge and there is presently a relatively high degree of realism possible in interfaces. This presents a need and an opportunity for even more realistic interaction techniques to better match the visual metaphors used and to achieve a higher level of ease of use for computer systems. We are striving towards the representation of object as photo realistic, three-dimensional (3D) models rather than as the icons and two-dimensional desktops of conventional computer technology.

Some examples of current technology for the creation of virtual three-dimensional workspace display interfaces are copending application Ser. No. 08/753,081, entitled "CREATING REAL WORLD OBJECTS" and Ser. No. 08/753,076, entitled "SYSTEM AND METHOD FOR MAINTAINING SIZE AND POSITION RELATIONSHIPS FOR NONRECTANGULAR REAL WORLD OBJECTS", assigned to the Assignee of the present application.

A 3D virtual workspace display environment is also described in an article entitled, "RAPID CONTROLLED MOVEMENT THROUGH A VIRTUAL 3D WORKSPACE", Jock Mackinlay et al., *Computer Graphics Publication*, Vol. 24, No. 4, August 1990, pp. 171–175, as well as in its related U.S. Pat. No. 5,276,785.

A more recent copending application assigned to the Assignee of the present invention is entitled, "VIEWER INTERACTIVE OBJECT IN VIRTUAL THREE-DIMENSIONAL WORKSPACE", D. Bardon et al. (Attorney Docket No. AT9-96310), which covers face views of virtual three-dimensional objects which may be triggered to appear on a display by interactive viewer input.

It is clear that current technology in virtual three-dimensional workspaces has provided environments which are user friendly, i.e. make the casual computer user feel more comfortable and at home with the interface. However, researchers in human factors have found downsides to three-dimensional virtual reality displays. Because of the many choices that the user has in wandering down various "streets and roads" or visiting a wide variety of "buildings or stores" or going through many possible "doors", the user may wander through this reality and perhaps get lost from the track or goal he is pursuing.

The present invention addresses this problem, i.e. that of helping the interactive user in three-dimensional graphic environments to stay focused and relate to the objects he is seeking to relate to in the manner he is seeking to relate to such objects even when these objects are arranged in 3D space in what appears to be infinite configurations.

In these virtual reality 3D environments as in the real world, the viewer or user is relating to the virtual objects in order to carry out a wide variety of tasks, some of which are quite simple and some very complex. In order for the user to stay focused and carry out his tasks as expeditiously as possible, it would be optimum for the virtual 3D system to provide simpler user interfaces for simple tasks and more comprehensive user interfaces for more complex tasks.

Thus, when the viewer's task is a simple one such as getting more information about a current movie film or about a newly released music CD, the user may be presented with his information in an interface as simple as a face view of a virtual 3D object which contains the information. For example, in the virtual 3D world or workspace, the viewer may navigate to a virtual three-dimensional object of a theater and get his desired movie film information from a face view of the object which presents a marquee of the theater. Similarly, the viewer seeking CD information might navigate to and be presented with a face view of a virtual CD vending kiosk which presents him with his desired information. The above-mentioned patent application, "VIEWER INTERACTIVE OBJECT IN VIRTUAL THREE-DIMENSIONAL WORKSPACE", D. B. Bardon et al., describes such face views of 3D virtual objects. With such simple tasks, the viewer notes his desired information, perhaps makes some simple choices and moves on with his navigation through the virtual 3D workspace.

On the other hand, the navigating viewer's task may be a more complex one like tracking and updating product sales information of a business or group of businesses or within a report or filing a tax statement.

The present invention permits the viewer or user to utilize conventional two-dimensional interfaces within his three-dimensional virtual reality workspace simultaneously with his continued navigation through his three-dimensional workspace.

SUMMARY OF THE INVENTION

Before setting forth the present invention, we should establish some basic characteristics of the virtual three-dimensional environment as described in the above-referenced patents and applications. It is understood that in order to navigate through three-dimensional space, view the space or relate to objects within the space, a viewpoint is determined within that space. That viewpoint is the virtual position of the viewer or person who is navigating within the three-dimensional space. The viewpoint is commonly defined by its position and its orientation or direction. For purposes of describing this invention, we will use the metaphor of a camera to understand the viewpoint. The camera's position and orientation are where it is and which way it is pointing. Let us refer to another property of a viewpoint which is "field of view"; this is effectively the resulting view from a given viewpoint. A key need of a viewer navigating through virtual three-dimensional space is to stay focused.

As set forth above, it is easier for the viewer to stay focused when the task for which he is accessing the object is a simple one. The present invention deals with helping viewers to stay focused in more complex tasks.

The present invention operates within the previously described data processor controlled display system for displaying a virtual three-dimensional workspace having three-dimensional objects which are interactively functional, i.e. may be picked by the viewer or user for various computer interactive functions.

A key element in the present invention is the provision of a two-dimensional workplane. This workplane is in a planar position in the three-dimensional workspace usually parallel to the plane of the display surface and preferably at the front of the three-dimensional workspace.

In addition, there is associated with and stored for each of a plurality of the functional virtual three-dimensional objects, at least one planar two-dimensional image of the virtual object, i.e. the two-dimensional image has sufficient visual similarity to the object which it represents that the viewer or user will intuitively connect the two as he addresses the three-dimensional workspace. The system provides user interactive means so that the user can select one of the virtual objects and means responsive to such a user selection for displaying the two-dimensional planar image associated with the selected object within the two-dimensional workplane.

The system further provides user interactive means permitting the user to functionally access the two-dimensional images within the workplane. Since the present system comprehends interactive user access to the three-dimensional object for various functions, there is thus provided interactive user access simultaneously to three-dimensional objects or their two-dimensional image representations for a variety of functions.

In accordance with the present invention, a user navigating in the three-dimensional workspace may desire to access a remote three-dimensional object in the three-dimensional workspace. Let us say that the three-dimensional object is a bank. If the viewer clicks on or appropriately selects the bank object, the result will be that a two-dimensional image of the bank will appear in a two-dimensional workplane readily accessible to the user. Now, if the user wishes to access the bank functionally, he has an interactive choice between the remote bank three-dimensional object and its two-dimensional image in the workplane.

If the user's needs with respect to the banking function are relatively simple, e.g. he needs to know banking hours or account balance or his last deposit, he may choose to access the remote object. In such a case, the user will be navigated to an appropriate face view of the bank object in accordance with the procedure described in the above-referenced copending application, "VIEWER INTERACTIVE OBJECT IN VIRTUAL THREE-DIMENSIONAL WORKSPACE", D. Bardon et al.

On the other hand, if the viewer requires more complex functional interactions with the bank, e.g. transfers between accounts, payment resolution, etc., he may select the two-dimensional image of the bank in said two-dimensional workplane and initiate an interactive dialog with a banking program as described in above-referenced copending application, "VIEWER INTERACTIVE THREE-DIMENSIONAL OBJECTS AND TWO-DIMENSIONAL IMAGES IN VIRTUAL THREE-DIMENSIONAL WORKSPACE", R. Berry et al.

In order to understand the present invention, it is important its advantages over conventional two-dimensional systems be considered. In such two-dimensional systems, the potential functions and applications of the display systems are represented by an array of icons which the user may respectively select in order to bring forth particular computer functional application interface on the display. Other than representing a particular computer function or program, these conventional two-dimensional icons of the prior art do not act in combination with other elements as do the three-dimensional object of the present invention to provide interrelated three-dimensional environment through which the viewer may navigate. Such a three-dimensional virtual workspace environment permits even the most complex of computer setups to be intuitively organized with respect to the viewer so that the viewer may navigate and make appropriate selections and combinations of selections.

It should be emphasized that a great advantage of the present invention is that it gives the viewer/user the option to use the three-dimensional object in its place in the workspace by the viewer navigating to it or to request the functional two-dimensional planar image of the object and using the two-dimensional image functionally at the viewer's position without any navigation to it.

DETAILED DESCRIPTION OF THE PREFERRED EMBODIMENT

Figure 1:
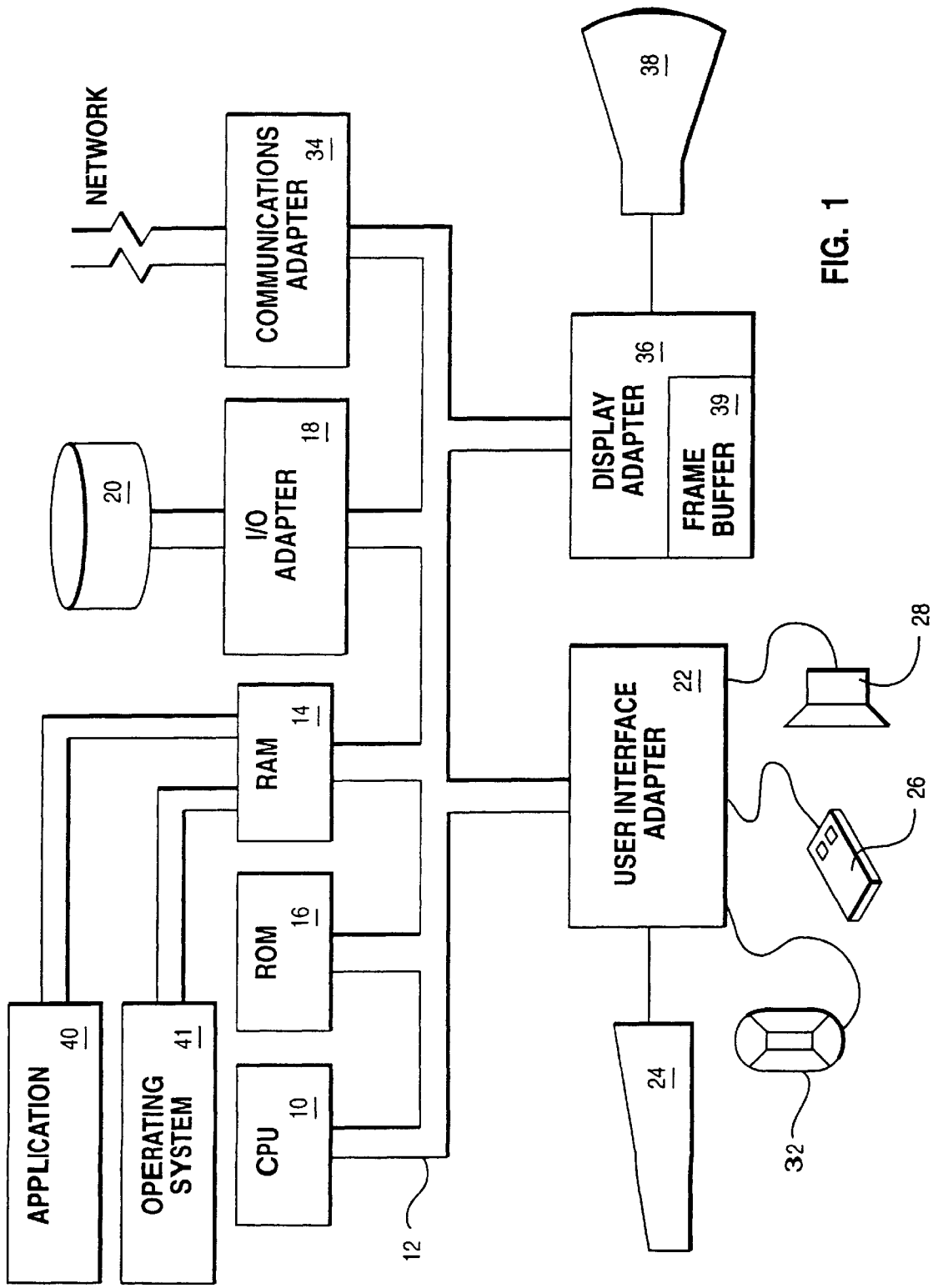
FIG. 1 is a block diagram of a data processing system including a central processing unit which is capable of implementing the present invention.

Before going into the details of specific embodiments, it will be helpful to understand from a more general perspective the various elements and method which may be used to implement the present invention. The present invention is implemented in three-dimensional virtual workspace. A three-dimensional workspace is a workspace that is perceived as extending in three orthogonal directions. Typically a display has a two-dimensional display surface and the perception of a third dimension is effected by visual clues such as perspective lines extending toward a vanishing point. Distant objects are obscured by nearer objects. The three-dimensional effect is also provided by showing changes in objects as they move toward or away from the viewer. Perspective shading of objects and a variety of shadowing of objects at different distances from the viewer also contribute to the three-dimensional effect.

A three-dimensional workspace is typically perceived as being viewed from a position within the workspace. This position is a viewpoint. This viewpoint provides the virtual interface between the display user and the display. The viewpoint's direction of orientation is the direction from the viewpoint into the field of view along the axis at the center of the field of view.

In order to present a three-dimensional workspace, a system may store data indicating "coordinates" of the position of an object, a viewpoint or other display feature in the workspace. Data indicating coordinates of a display feature can then be used in presenting the display feature so that it is perceptible as positioned at the indicated coordinates. The "distance" between two display features is the perceptible distance between them, and can be determined from their coordinates if they are presented so that they appear to be positioned at their coordinates.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The description of the present invention often refers to navigation within the three-dimensional virtual workspace. The workspace or landscape is navigable using conventional three-dimensional navigation techniques. A user may move around or navigate within the three-dimensional data representation to alter his perspective and view of the displayed representation of the data. Thus, a user may be referred to as a navigator. The navigator is actually stationary, and his view of the display space changes to give him the sensation of moving within the three-dimensional graphical space. Thus, we speak in terms of the navigator's perceived motion when we refer to changes in his view of the display space. As the user moves, his view of the data changes accordingly within the three-dimensional data representation. Some navigation modes include browsing, searching and data movement. U.S. Pat. No. 5,555,354 (Strasnick et al., Sep. 10, 1996) describes some known navigation techniques.

The three-dimensional objects which will be subsequently described in embodiments of the present invention may be best implemented using object oriented programming techniques, such as the object oriented techniques described in the above-mentioned copending application Ser. No. 08/753,076 assigned to the Assignee of the present invention. The objects of that copending application are implemented using the C++ programming language. C++ is a compiled language. The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related method are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, each type of variable (numbers, characters and dollars). After the methods have been defined, a program can later refer to the addition method by its common format (A+B) and, during compilation, the compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such pre-defined classes and libraries are typically called "frameworks" and essentially provide a prefabricated structure as a basis for creating a working application program.

In object oriented programming such as the previously described VRT software platform, there is provided for the user interface a framework containing a set of predefined interface objects. The framework contains predefined classes which can be used as base classes and a developer may accept and incorporate some of the objects into these base classes, or he may modify or override objects or combinations of objects in these base classes to extend the framework and create customized solutions in particular areas of expertise.

This object oriented approach provides a major advantage over traditional programming since the programmer is not changing the original program, but rather extending the capabilities of the original program.

The above-described Superscape Virtual Reality Toolkit (VRT) provides the architectural guidance and modeling, but at the same time frees developers to supply specific actions unique to the particular problem domain which the developer is addressing.

Therefore, those skilled in the art will understand how the present invention is implemented using object oriented programming techniques as described above.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described, it will be understood that these may be rendered by storing a virtual reality three-dimensional image creation application program 40 such as the previously described VRT of Super-scape in the RAM 14 of the system of FIG. 1. Also stored on the RAM will be a suitable operating system 41 such as DOS or Windows.

Figure 2:
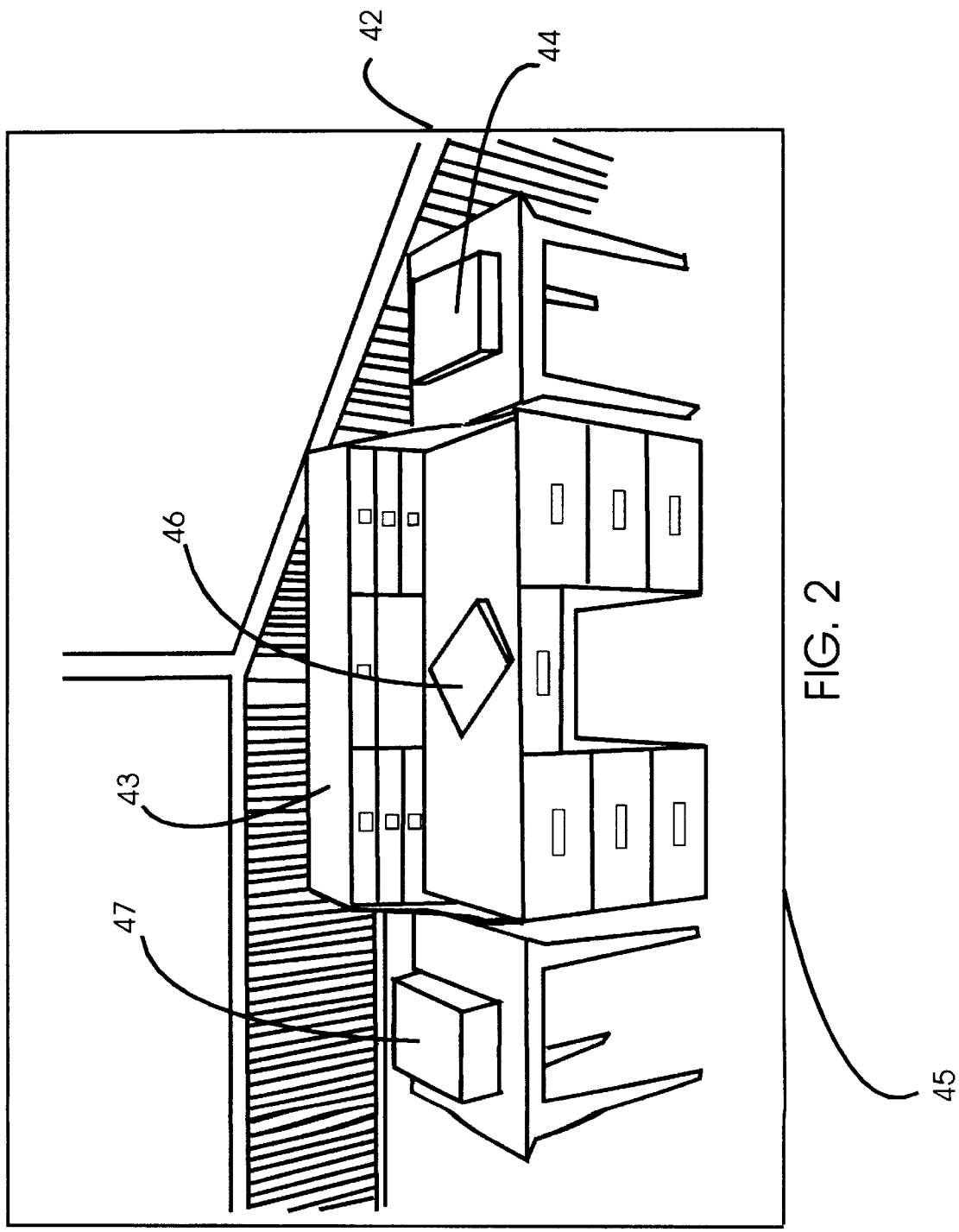
FIG. 2 shows a virtual reality workplace in accordance with the present invention at an initial viewpoint.
Figure 3:
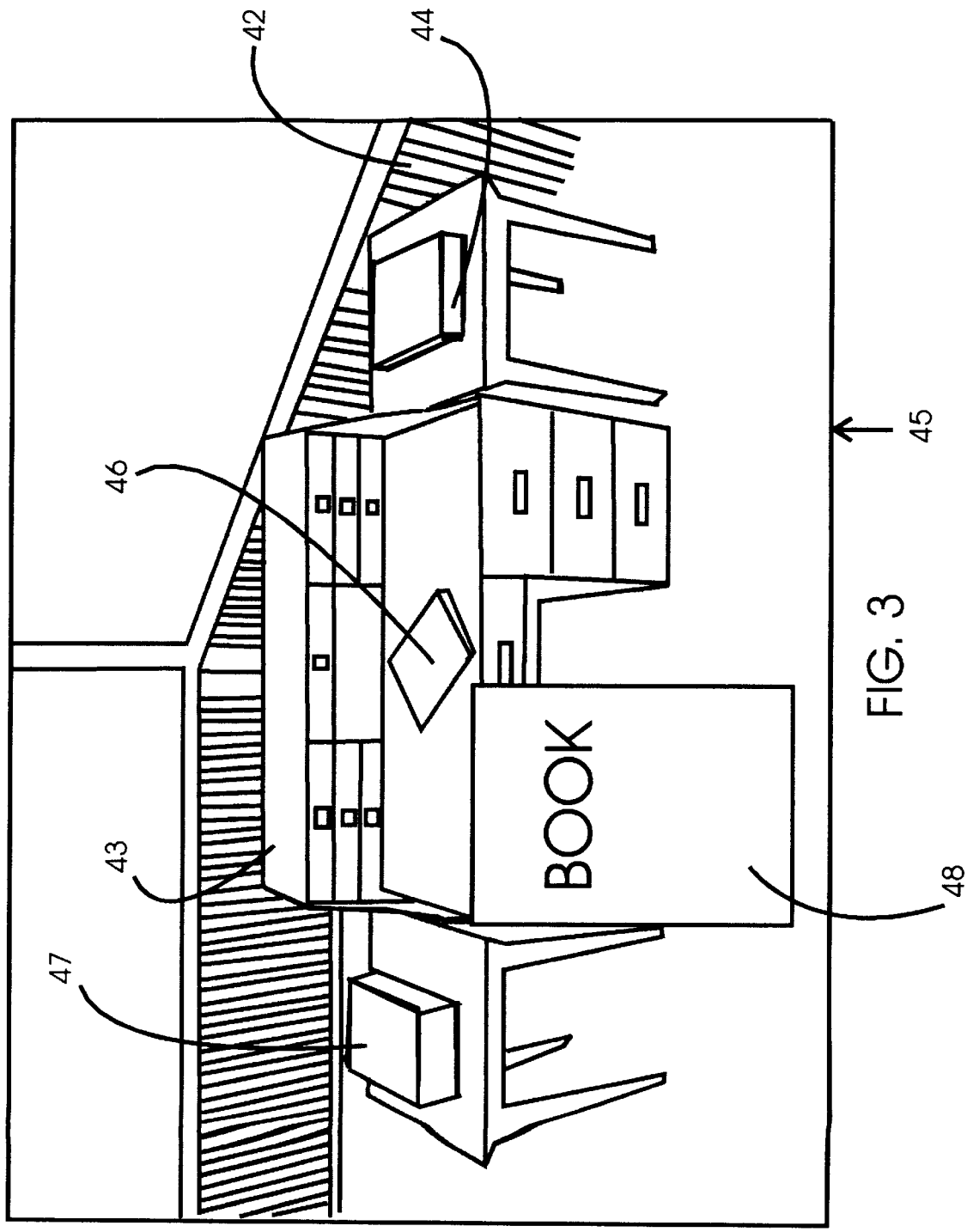
FIG. 3 is a representation of the initial stage of the present invention wherein the two-dimensional image of one of the objects has been selected and a planar two-dimensional workplane containing a two-dimensional image of the object is setup.

An embodiment of the present invention will now be described with respect to the virtual reality workspace shown in FIG. 2. The workspace 42 is shown as an office environment with a desk 43, as well as a telephone answering machine 44, as well as other office equipment and tables which need not be described here. On the desk 43 is a book 46. The workspace 42 is centered within a viewpoint interface which is presented to the viewer on display monitor 38 of FIG. 1. In accordance with conventional techniques, the user may control the viewpoint 45 through a conventional I/O device such as mouse 26 or FIG. 1 which operates through the user interface 22 of FIG. 1 to call upon VRT programs in RAM 14 operating with the operating system 41 to create the images in frame buffer 39 of display adapter 36 to control the display on monitor 38. Using conventional virtual three-dimensional workspace navigation techniques, the viewpoint interface 45 of FIG. 2 is changeable as the viewer moves closer or backs away from objects in the workspace or moves to right or to the left in the workspace. All this may be controlled by a suitable I/O device such as mouse 26 of FIG. 1. The previously mentioned devices within workspace 42 are functional three-dimensional objects such as book 46, telephone answering equipment 44 or dictation player 47. The images for these various objects are stored as data from which the objects may be created on the display in RAM 14 of FIG. 1 in connection with the VRT program.

Let us assume that a user or viewer is navigating through a three-dimensional workspace in which the viewpoint 45 of FIG. 2 is a stage. When he reaches viewpoint 45 in FIG. 2, the viewer has a need to access some extensive reading material which is stored and represented by book object 46. The system provides for viewer selection of any one of the objects in FIG. 2 such as book 46, dictating machine 47 or telephone answering machine 44. The viewer selects any one of these objects through some appropriate pointing device such as mouse 26 in FIG. 1. When the viewer clicks onto book 46 using mouse 26 in FIG. 1, the result is as shown in FIG. 2: a planar two-dimensional image 48 of the book appears on the display screen in front of the three-dimensional workspace in viewpoint 45. It should be here emphasized 22 as stated earlier. The viewer has the option of using three-dimensional book 46 in its place or by calling the two-dimensional image of the book 48 into the two-dimensional plane at the user's viewpoint.

Actually, the book is part of an invisible two-dimensional workplane which is stored in the system, i.e. it is created/designed for the system. It is in a plane essentially parallel to the monitor interface which makes up viewpoint 45 and is preferably stored at a position close to the very front of the virtual workspace 42 so that the workplane is positioned such that a direction of the viewpoint is substantially perpendicular to the workplane. As will be hereinafter described, the viewer may designate a plurality of objects in the three-dimensional workspace and functional interactive two-dimensional images, such as book 48, of these three-dimensional objects will appear in the workplane and will be functionally interactive with the viewer. In the present case, as will be seen with reference to FIG. 4, the two-dimensional image 48 of book 46 is interactive so that the viewer by simple means such as clicking with mouse 26 in FIG. 1, may turn the pages in the book and refer to the material contained therein.

Figure 4:
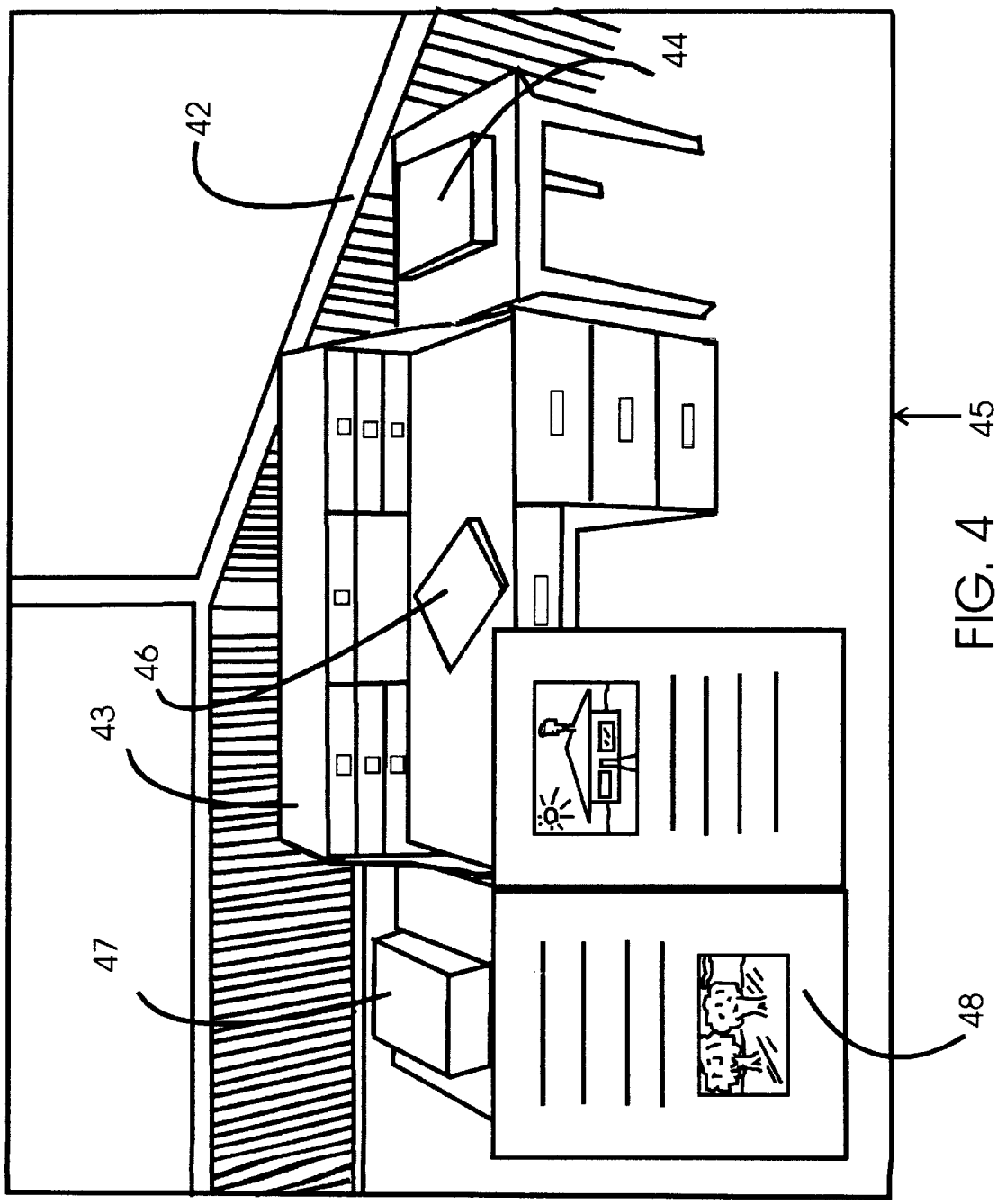
FIG. 4 is the view of FIG. 3 after the two-dimensional image has been functionally addressed by an interactive user.

With reference to FIG. 4, two-dimensional book image 48 is shown after several of the pages have been interactively turned to a particular position in the book page hierarchy.

At this point, the user or viewer wishes to add another two-dimensional images to his workplane. So, as previously described, he selects and clicks onto telephone machine 44, and, as shown in FIG. 5, a functional interactive two-dimensional image 49 of the telephone machine appears in the workplane alongside of interactive book image 48.

Figure 5:
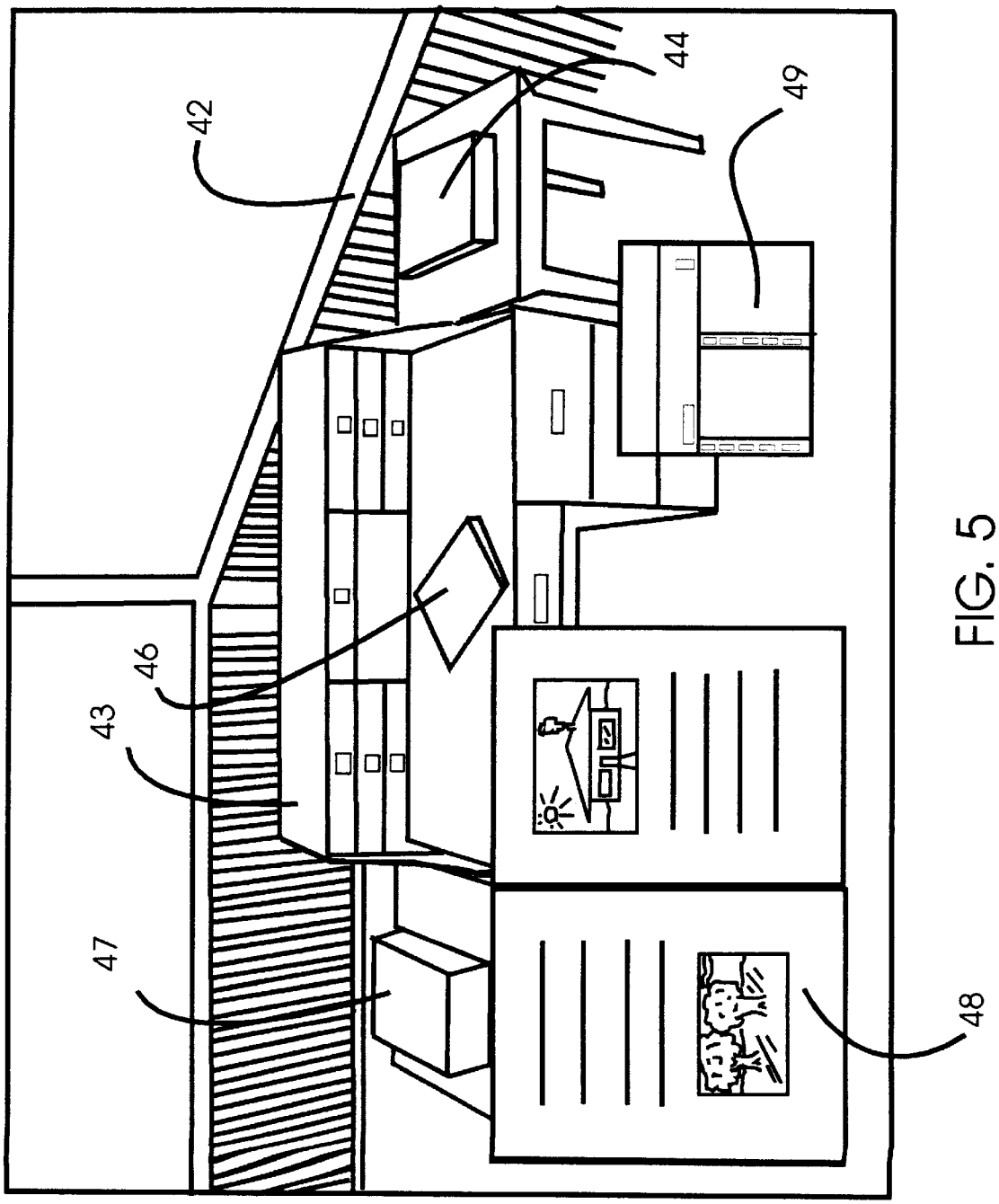
FIG. 5 is the view of FIG. 4 after a two-dimensional image of another object has been selected and placed into the two-dimensional workplane.

The key to the present invention will be understood with reference to FIG. 5. What we have in FIG. 5 are two three-dimensional objects, book 46 and telephone machine 44, as well as functional two-dimensional respective images of such objects, book image 48 and telephone machine image 49. The user or viewer now has the option in the workspace before him of either interactively engaging the objects, book 46 and answering machine 44, or their two-dimensional images, book image 48 and telephone machine image 49. It is usually the case that the viewer will choose to access the three-dimensional object for simpler interactive tasks and the respective two-dimensional images in the workplane for more complex interactive tasks. The above-mentioned copending application entitled, "VIEWER INTERACTIVE OBJECT IN VIRTUAL THREE-DIMENSIONAL WORKSPACE", D. Bardon et al. (Attorney Docket No. AT9-96-310), describes a process wherein a viewer may obtain a selected three-dimensional face view of the object through accessing the respective three-dimensional object.

Although the images in FIG. 5 have been oversimplified in order to describe the present invention in general, it will be understood that if the viewer wanted to obtain relatively simple information with respect to book 46, such as title, author, date of issue or publisher, he could very well get some information from obtaining a three-dimensional face of view of book object 46 as described in this Bardon et al. copending application. However, as in the present case, if the viewer needed to get extensive access to the referenced content in the book, he could more readily obtain such information by leafing through the pages of two-dimensional book image 48. Similarly, with respect to telephone machine 44, if the viewer were merely interested in checking his answering to determine if there were any messages, he could very well obtain such information merely by getting the preferred or selected three-dimensional face view of telephone object 44 using the process of the Bardon et al. copending application. On the other hand, if he were interested in carrying out more complex information such as changing his telephone machine directory or its quick dial files, he would probably want to work with the two-dimensional image of the telephone machine 49 in the two-dimensional workplane.

Figure 6A:
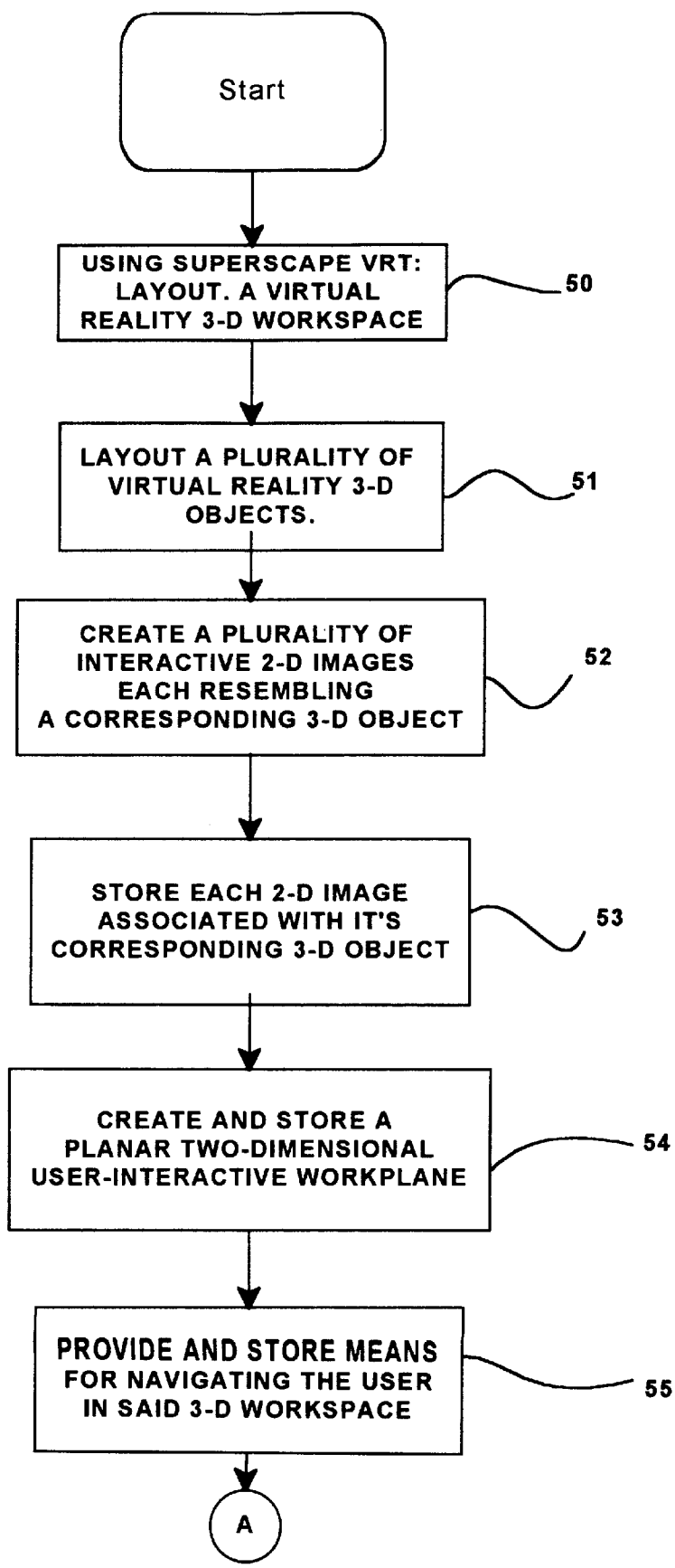
FIGS. 6A, 6B and 6C are flowcharts of a process implemented by the present invention for creating a two-dimensional workplane in front of the three-dimensional workspace; the two-dimensional workplane containing a plurality of two-dimensional image representations of three-dimensional objects in the three-dimensional workspace.
Figure 6B:
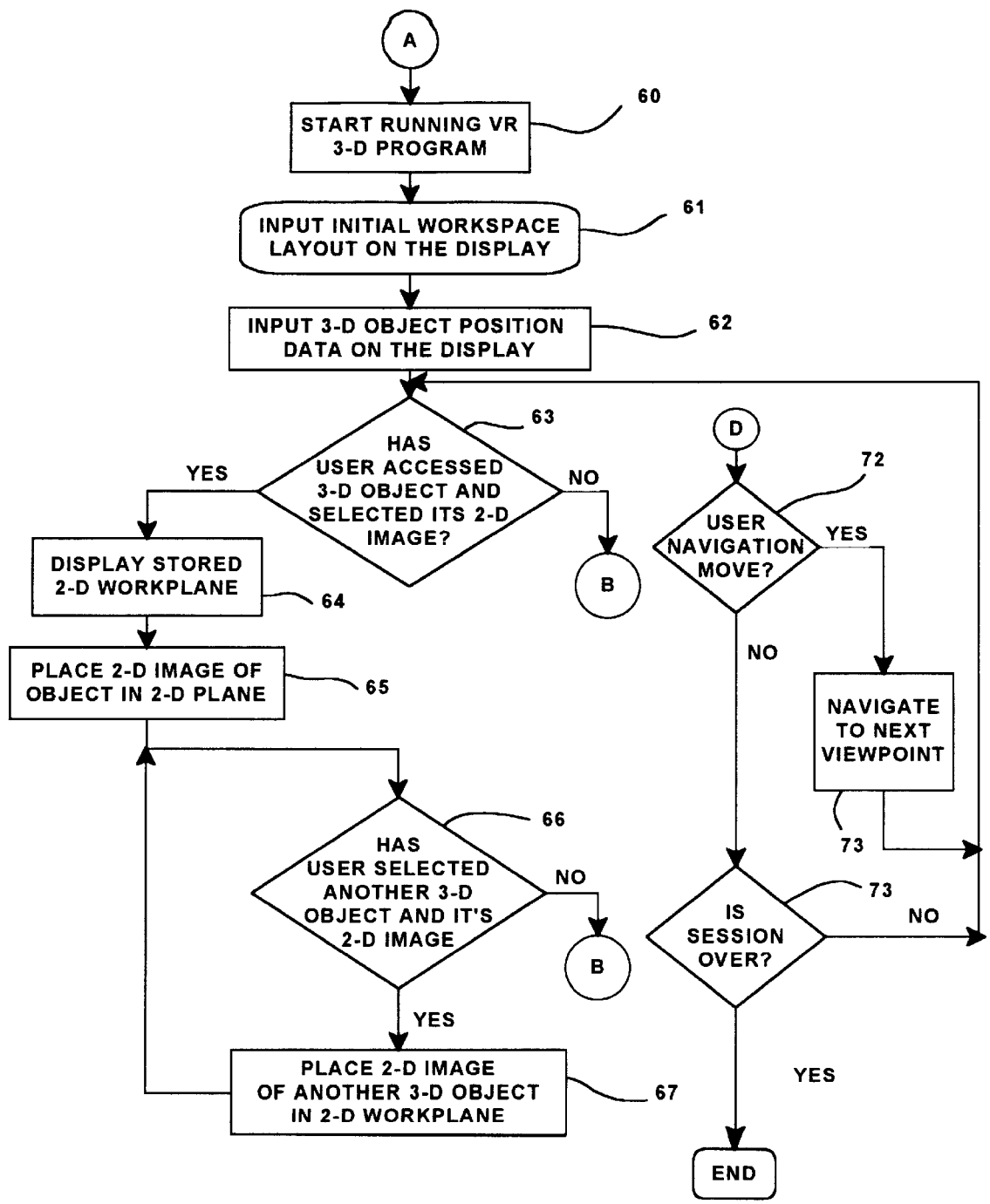

Now with reference to FIGS. 6A and 6B, we will describe the process implemented by the present invention in conjunction with the flowcharts of FIGS. 6A and 6B. The flowcharts are in two parts: the steps in FIG. 6A relate to the development of the virtual reality landscaped objects as well as the two-dimensional user interfaces provided for the interactive two-dimensional images.

The developments are made in accordance with the present invention using the previously described Superscape VRT object oriented programming toolkit. First, step 50, FIG. 6A, the virtual reality three-dimensional workspace, for example, workspace 42, FIG. 2, is created and stored. Next, step 51, the virtual reality three-dimensional objects are created and stored. These would include object oriented code representations of such objects as book 46, telephone machine 44 or dictation player 47 in FIG. 2. Next, step 52, a plurality of interactive two-dimensional images, each resembling a corresponding three-dimensional object in workspace 42 of FIGS. 2 through 5 are created. In other words, the program will design or create a corresponding two-dimensional image resembling the respective object. By resembling we mean that the two-dimensional image must be such that the user of the system will intuitively understand that the three-dimensional object will have a sufficient likeness to its two-dimensional image that the user can make the connection between the two intellectually when confronted with the need to relate to the two-dimensional image of the object rather than the object itself. Next, step 53, each two-dimensional interactive object image is stored associated with its corresponding three-dimensional object. Next, step 54, the previously described two-dimensional workplane is created and stored. This would include its position with respect to the three-dimensional workspace as previously described. Then, step 55, a conventional means is provided for navigating through virtual reality workspace in FIGS. 2 through 5 using, for example, the navigational technique of changing the viewpoint such as viewpoint 45.

The process then proceeds to point A in FIG. 6B, whereat the created virtual reality workspace program run, step 60. As previously mentioned, the program is run on a system such as that shown in FIG. 1 with a particular application program being loaded on RAM 14 and connected to display adapter 36 which forms the stored images via frame buffer 39 controlling monitor 38. The program initially sets up workspace layout on the display as well as the object layout and positions of the objects in the workspace, steps 61 and 62.

At this point, we will proceed to the aspect of the procedure applicable to the present invention. First, in decision block 63, the system determines whether user has accessed a three-dimensional object and selected to show its two-dimensional image. Let us assume that the user has selected book 46 in FIG. 2. In such a case, the system sets up the two-dimensional workplane, step 64, as previously described, and then places the two-dimensional image of the object in the present case, book 48, FIG. 3, in this two-dimensional workspace, step 65. The system then proceeds to decision block 66 where an additional determination is made as to whether the user has selected another three-dimensional object so that its two-dimensional functional image may be displayed. If the decision is yes, i.e. the telephone machine 44 is selected, FIG. 5, then, its two-dimensional image 49, FIG. 5, is placed in the two-dimensional workplane alongside of book image 48, step 67 in FIG. 6B. The system then returns to decision block 66 where a determination is made as to whether the user has selected any additional three-dimensional objects for corresponding two-dimensional image inclusion in the workplane. If, as in the present situation, only two objects have been selected, the decision from block 66 is no and the system then branches to entry point B in FIG. 6C.

Next, decision block 68, a determination is made as whether the user has selected any three-dimensional object for functional interaction. If the user has, then, step 69, the system would set up the function selected. In the present case, no such function has been selected in the illustrative example if FIGS. 2 through 5, but if there had been a function selection such as if the viewer had selected the particular functional face view of book object 46 or telephone machine 44, then that function would have been setup, i.e. the appropriate face view would have been setup for this function. However, in the present example of FIGS. 2 through 5, no functional interaction with an object has been selected and, thus, the system proceeds to decision block 70 where a determination is made as to whether the user has selected one of the two-dimensional images for functional interaction. In the present example, the user has already selected book 48 and, thus, the system proceeds to setup and display in the two-dimensional workplane a two-dimensional interactive interface for the selected function, step 71. In the present case, this would be the page turning and information retrieval as illustrated by book 48 in FIG. 4. Upon completion of this, the system returns to decision block 70 where a further determination is made as to whether any other function has been selected with respect to a two-dimensional image. If, as in the present case, no additional two-dimensional image function has been selected, the system returns to point D in FIG. 6B, which is the same point at which the system would be if no further three-dimensional object in decision block 63 would have been selected to have its two-dimensional image shown in the workplane.

Accordingly, at this point, a determination is made, decision block 72, FIG. 6B, as to whether the user has initiated a navigation move. If the viewer has selected a navigation move, then the system navigates to the next viewpoint, step 73, and process is returned to decision block 63 where the process described is reinitiated for the next viewpoint. On the other hand, if there is no further navigation move from decision block 72, then the system proceeds to decision block 73 where a determination is made as to whether the session is over. If the user has chosen not to terminate the session, the system is once again branched back to initial decision block 63. On the other hand, if the viewer has ended the session, decision block 73, the procedure is ended.

Figure 6C:
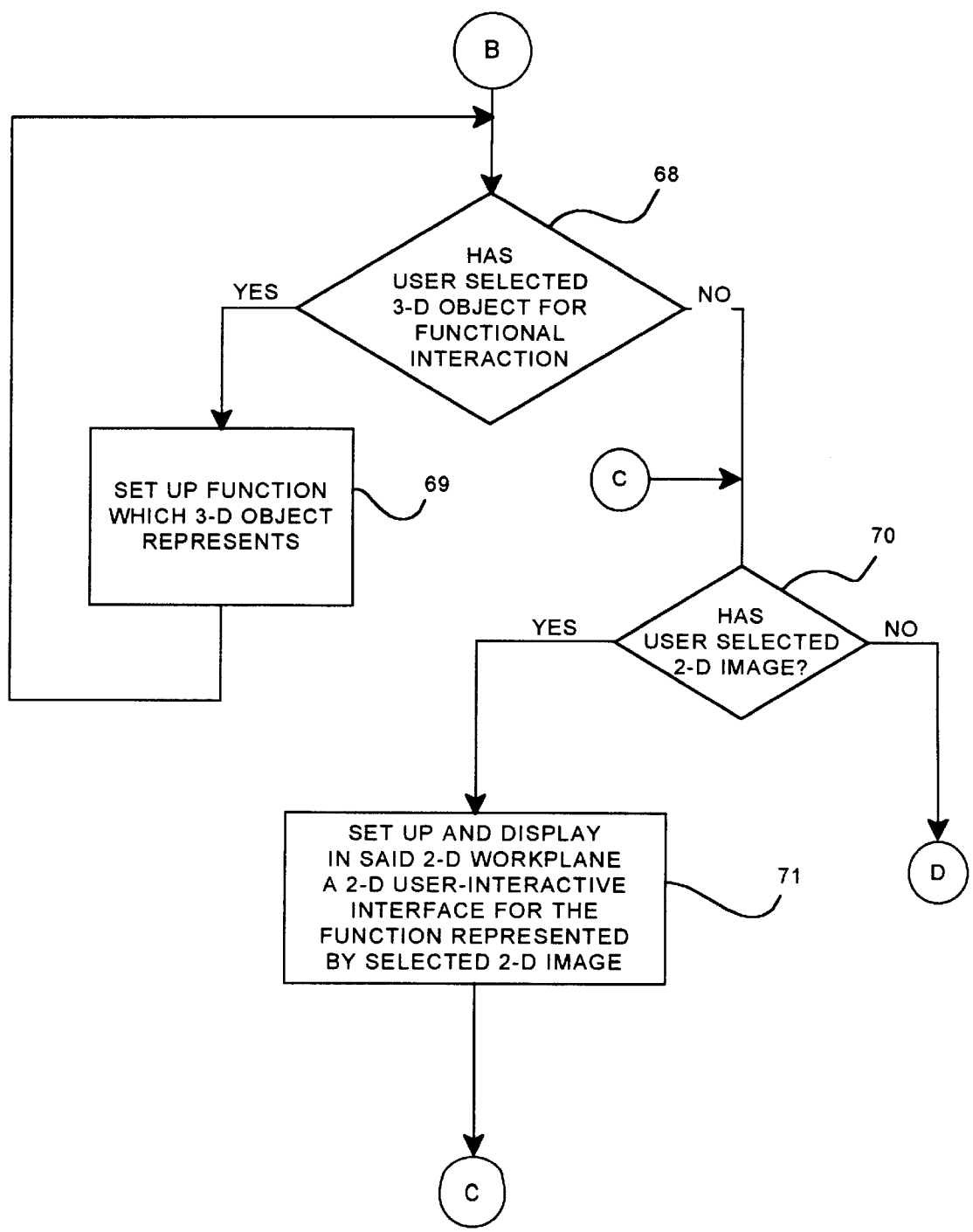

If the decision block 63 is no, then the system branches to decision block 68 via point B, FIG. 6C, where the previously described determination is made as to whether a three-dimensional object has been selected.

Although certain preferred embodiments have been shown and described, it will be understood that many changes and modifications may be made therein without departing from the scope and intent of the appended claims.

We claim:

1. A data processor controlled display system for simultaneous interactive accessing of three-dimensional objects and two-dimensional image representations of such objects in a virtual three-dimensional workspace comprising:

means for displaying a plurality of virtual three-dimensional objects in and environmentally associated with said virtual workspace;

means for storing for each of said virtual objects, at least one planar two-dimensional image of said virtual object;

user interactive means for functionally accessing said three-dimensional objects;

means for displaying a two-dimensional user-interactive workplane within said three-dimensional workspace;

user interactive means for selecting at least one of said virtual objects;

means responsive to said selecting means displaying the two-dimensional image of said selected object in said two-dimensional workplane; and user interactive means for functionally accessing said two-dimensional image of said object, whereby a user has simultaneous functional access to a three-dimensional object or the two-dimensional image of said object.

2. The display system of claim 1 wherein a plurality of said two-dimensional images are displayed in said interactive two-dimensional workplane.

3. The display system of claim 2 further including means for displaying only a portion of said three-dimensional workspace in a user view point on said display and viewer interactive means for navigating from a first viewpoint to a second viewpoint, whereby one of said three-dimensional objects and the two-dimensional image of said object are displayed and accessible in said first viewpoint while only said two-dimensional image is displayed and visible within said second viewpoint.

4. The display system of claim 1 wherein the selected virtual three-dimensional object is at a remote position in said virtual workspace and said two-dimensional workplane in which the resulting two-dimensional image is displayed is in front of the three-dimensional workspace.

5. A data processor implemented method for simultaneous interactive accessing of three-dimensional objects and two-dimensional image representations of such objects in a virtual three-dimensional workspace on a display comprising:

displaying a plurality of virtual three-dimensional objects in and environmentally associated with said virtual workspace;

storing for each of said virtual objects, at least one planar two-dimensional image of said virtual object;

user interactively accessing said three-dimensional objects for data processing functions;

displaying a two-dimensional user-interactive workplane within said three-dimensional workspace;

user interactively selecting at least one of said virtual objects;

displaying the two-dimensional image of said selected object in said two-dimensional workplane in response to said selection; and user interactively accessing said two-dimensional image of said object for a data processing function, whereby a user has simultaneous functional access to a three-dimensional object or the two-dimensional image of said object.

6. The method of claim 5 wherein a plurality of said two-dimensional images are displayed in said interactive two-dimensional workplane.

7. The method of claim 6 further including the step of displaying only a portion of said three-dimensional workspace in a user view point on said display and the step of viewer interactively for navigating from a first viewpoint to a second viewpoint, whereby one of said three-dimensional objects and the two-dimensional image of said object are displayed and accessible in said first viewpoint while only said two-dimensional image is displayed and visible within said second viewpoint.

8. The method of claim 5 wherein the selected virtual three-dimensional object is at a remote position in said virtual workspace and said two-dimensional workplane in which the resulting two-dimensional image is displayed is in front of the three-dimensional workspace.

9. A computer readable program having data structure included on a computer readable medium which provides for the simultaneous interactive accessing of three-dimensional objects and two-dimensional image representations of such objects in a virtual three-dimensional workspace on a display comprising:

means for displaying a plurality of virtual three-dimensional objects in and environmentally associated with said virtual workspace;

means for storing for each of said virtual objects, at least one planar two-dimensional image of said virtual object;

user interactive means for functionally accessing said three-dimensional objects;

means for displaying a two-dimensional user-interactive workplane within said three-dimensional workspace;

user interactive means for selecting at least one of said virtual objects;

means responsive to said selecting means for displaying the two-dimensional image of said selected object in said two-dimensional workplane; and user interactive means for functionally accessing said two-dimensional image of said object, whereby a user has simultaneous functional access to a three-dimensional object or the two-dimensional image of said object.

10. The computer program of claim 9 wherein a plurality of said two-dimensional images are displayed in said interactive two-dimensional workplane.

11. The computer program of claim 10 further including means for displaying only a portion of said three-dimensional workspace in a user view point on said display and viewer interactive means for navigating from a first viewpoint to a second viewpoint, whereby one of said three-dimensional objects and the two-dimensional image of said object are displayed and accessible in said first viewpoint while only said two-dimensional image is displayed and visible within said second viewpoint.

12. The computer program of claim 9 wherein the selected virtual three-dimensional object is at a remote position in said virtual workspace and said two-dimensional workplane in which the resulting two-dimensional image is displayed is in front of the three-dimensional workspace.

* * * * *